(12) United States Patent
Zhu

(10) Patent No.: US 9,427,831 B2
(45) Date of Patent: Aug. 30, 2016

(54) METHOD AND SYSTEM FOR MANUFACTURING NESTED PROFILE COMBINATION

(71) Applicant: Ningbo Bangda Intelligent Parking System Co., Ltd., Ningbo (CN)

(72) Inventor: Jianhua Zhu, Ningbo (CN)

(73) Assignee: Ningbo Bangda Intelligent Parking System Co., Ltd., Ningbo (CN)

( * ) Notice: Subject to any disclaimer, the term of this patent is extended or adjusted under 35 U.S.C. 154(b) by 319 days.

(21) Appl. No.: 13/971,880

(22) Filed: Aug. 21, 2013

(65) Prior Publication Data

US 2013/0333194 A1 Dec. 19, 2013

Related U.S. Application Data

(63) Continuation-in-part of application No. PCT/CN2011/002040, filed on Dec. 7, 2011.

(30) Foreign Application Priority Data

Feb. 22, 2011 (CN) .......................... 2011 1 0044403

(51) Int. Cl.
*B23P 13/00* (2006.01)
*B21D 35/00* (2006.01)
(Continued)

(52) U.S. Cl.
CPC ............... *B23P 13/00* (2013.01); *B21D 35/00* (2013.01); *B21D 35/001* (2013.01); *B21D 47/04* (2013.01); *B23P 19/107* (2013.01); *B23P 19/10* (2013.01); *Y10T 29/49925* (2015.01); *Y10T 29/5176* (2015.01)

(58) Field of Classification Search
CPC .. B21D 35/00; B21D 35/001; B21D 35/003; B21D 39/02; B21D 39/021; B21D 39/023; B21D 39/026; B21D 37/01; B21D 47/04; B23P 19/02; B23P 19/04; B23P 19/10; B23P 19/107; B23P 21/00; B23P 21/008; B23P 13/00; Y10T 29/49625; Y10T 29/49627; Y10T 29/49778; Y10T 29/49829; Y10T 29/49925; Y10T 29/49998; Y10T 29/5176; Y10T 29/53348; Y10T 29/53352
See application file for complete search history.

(56) References Cited

U.S. PATENT DOCUMENTS

| | | | | |
|---|---|---|---|---|
| 3,140,739 A * | 7/1964 | Moltchan | ............... | B23D 25/04 72/129 |
| 3,380,145 A * | 4/1968 | Stroud | ................... | B21D 53/74 29/411 |
| 3,670,399 A * | 6/1972 | George | .................... | B21D 5/08 29/243.58 |

(Continued)

FOREIGN PATENT DOCUMENTS

DE 102006031261 B3 * 1/2008 ............. B21D 47/04

*Primary Examiner* — Edward Tolan
(74) *Attorney, Agent, or Firm* — Matthias Scholl, PC; Matthias Scholl

(57) ABSTRACT

A method for manufacturing a nested profile combination, including: planishing process, forming process, punching process, cross section shaping process, nesting process, and fastening process. A system for manufacturing the nested profile combination, includes: a profile planisher; a first rolling die set; a punching device; a second rolling die set; a cutting device; a nesting device; and a third rolling die set. The first rolling die set including a plurality of first rolling sets. The punching device includes a punching bed and a punching machine. The second rolling die set including a plurality of second rolling sets. The cutting device includes a cutter. The third rolling die set includes a third rolling set.

8 Claims, 9 Drawing Sheets

(51) Int. Cl.
  B21D 47/04 (2006.01)
  B23P 19/10 (2006.01)

(56) References Cited

U.S. PATENT DOCUMENTS

| | | | | |
|---|---|---|---|---|
| 6,860,181 B2 * | 3/2005 | Aubourg | ................ | B21D 53/74 209/684 |
| 7,089,667 B2 * | 8/2006 | McAdoo | ................ | B23Q 1/032 227/152 |
| 2003/0061782 A1 * | 4/2003 | Fisher | ................... | B21C 37/104 52/846 |
| 2004/0194275 A1 * | 10/2004 | Kummle | ................ | B21C 37/08 29/430 |
| 2010/0037668 A1 * | 2/2010 | Theophilus | ............. | E04F 17/06 72/7.4 |

* cited by examiner

METHOD AND SYSTEM FOR MANUFACTURING NESTED PROFILE COMBINATION

CROSS-REFERENCE TO RELATED APPLICATIONS

This application is a continuation-in-part of International Patent Application No. PCT/CN2011/002040 with an international filing date of Dec. 7, 2011, designating the United States, now pending, and further claims priority benefits to Chinese Patent Application No. 201110044403.2 filed Feb. 22, 2011. The contents of all of the aforementioned applications, including any intervening amendments thereto, are incorporated herein by reference.

BACKGROUND OF THE INVENTION

1. Field of the Invention

The invention relates to a method for manufacturing a load-bearing member, and more particularly to a method and a system for manufacturing a nested profile combination.

2. Description of the Related Art

As shown in FIGS. 6-9, a typical nested profile combination includes a first profile member 1' and a second profile member 2'. The first profile member 1' and the second profile member 2' are strip members having cross sections of the same shapes and sizes. The nesting process includes: rotating the first profile member 1' for 180°, and nesting the first profile member 1' and the second profile member 2'. A cross section of the first profile member 1' includes: two first transverse sides 11', a first lateral side 12', a first embedded flanging 13', a first encircling flanging 14', a first bent part 131', and a first stiffener 121'. The two first transverse sides 11' are arranged in parallel. Two ends of the first lateral side 12' are perpendicularly connected to one end of each of the first transverse sides 11', respectively. The first embedded flanging 13' and the first encircling flanging 14' are oppositely arranged on the other end of each of the first transverse sides 11', respectively. The first bent part 131' is formed by bending an end of the first embedded flanging 13' inwards. The first lateral side 12' is concaved inwardly to form the first stiffener 121'. A cross section of the second profile member 2' includes: two second transverse sides 21', a second lateral side 22', a second embedded flanging 23', a second encircling flanging 24', a second bent part 231', and a second stiffener 221'. The two second transverse sides 21' are arranged in parallel. Two ends of the second lateral side 22' are perpendicularly connected to one end of each of the second transverse sides 21', respectively. The second embedded flanging 23' and the second encircling flanging 24' are oppositely arranged on the other end of each of the second transverse sides 21', respectively. The second bent part 231' is formed by bending an end of the second embedded flanging 23' inwards. The second lateral side 22' is concaved inwardly to form the second stiffener 221'. In assembly of the first and the second profile members, allow the first transverse sides 11' to contact with the second transverse sides 21', the first embedded flanging 13' to contact with an inner surface of the second lateral side 22', the first encircling flanging 14' to contact with an outer surface of the second lateral side 22', and the first bent part 131' to contact with a second inwardly convex part 222' of the second stiffener 221'. Allow the second embedded flanging 23' to contact with an inner surface first lateral side 12', the second encircling flanging 24' to contact with an outer surface of the first lateral side 12', the second bent part 231' to contact with a first inwardly convex part 122' of the first stiffener 121'. When the first profile member 1' and the second profile member 2' are nested, an end of the first encircling flanging 14' is bent inwardly to form a first undercut 141'; an end of the second encircling flanging 24' is bent inwardly to form a second undercut 241'. Thus, the first undercut 141' is attached to a second outwardly concaved part 223' of the second stiffener 221'; and the second undercut 241' is attached to a first outwardly concaved part 123' of the first stiffener 121', thereby realizing the position limitation of the first profile member 1' and the second profile member 2' in a direction along lateral side. To intensify the intensity and rigidity of the profile, the first stiffener 121' is provided with a first recess 124' having a C-shaped cross section, and an opening of the first recess 124' faces the same direction of an opening of the first profile member 1'. The second stiffener 221' is provided with a second recess 224' having the C-shaped cross section, and an opening of the second recess 224' faces the same direction of an opening of the second profile member 2'. The first transverse sides 11' are provided with first convex ribs 111', respectively; and the second transverse sides 21' are provided with the second convex ribs 211'.

A typical method for manufacturing the nested profile combination includes: manufacturing two separate profile members, and performing cutting, perforating (multi-station), and stiffener formation on the profile members; rolling the profile members to form the transverse sides, the lateral sides, the embedded flangings, and the encircling flangings; nesting the two profile members together; and bending the encircling flangings inwardly by rolling to fastening corresponding lateral sides.

The above method is performed on different stations off-line, thereby resulting in discrete processes and transfer between different stations. The method is disadvantageous in the following aspects: first, the method has a large consumption of energy and time, as well as poor manufacture precision and large positioning error. For example, as the perforating process is followed by stiffener formation process, the precision of the distance between through holes is influenced by the stretching and deformation of the profile in the stiffener formation. Furthermore, procedures of multi-station necessitate auxiliary procedures for adjustment and clamping, which consume much auxiliary work time and result in accumulated error in different procedures. Finally, the machining, cutting, perforating, and rolling processes require manual feed of the material, which not only has low speed and efficiency, but also is difficult to control the geometric precision and form and position tolerance, thereby resulting in low material utilization and low yield.

SUMMARY OF THE INVENTION

In view of the above-described problems, it is one objective of the invention to provide a method for manufacturing a nested profile combination. The method significantly lowers the consumption of the raw material, ensures the precision in the manufacturing process, and has a high mechanical degree and production efficiency.

It is another objective of the invention to provide a system for manufacturing a nested profile combination according to the method.

To achieve the above objective, in accordance with one embodiment of the invention, there is provided a method for manufacturing a nested profile combination. The method comprises the following steps, all of which are carried out automatically on a production line:

1) planishing process: transporting a metal strip to a profile planisher for planishing, and transporting the metal strip automatically to a subsequent process of the production line;
2) forming process of a stiffener: transporting the metal strip to a first rolling die set, rolling the metal strip to form a stiffener;
3) punching process: transporting the metal strip comprising the stiffener to a punching device to form through holes on the metal strip;
4) cross section shaping process: transporting the punched metal strip to a second rolling die set, rolling the metal strip to yield a profile having a cross section in a required shape, the profile comprising an embedded flanging and an encircling flanging;
5) nesting process: transporting the profile to a cutting device, cutting the profile to yield a first profile member; transporting the first profile member to a nesting device, rotating the first profile member for 180° in a direction of the cross section thereof, and positioning the first profile member; cutting the profile again to yield a second profile member; and inserting and nesting the first profile member in the second profile member to form a profile combination, whereby the encircling flanging of the first profile member contacting with a lateral side of the second profile member and the encircling flanging of the second profile member contacting with a lateral side of the first profile member; and
6) fastening process: transporting the profile combination to a third rolling die set, shaping the encircling flangings of the first profile member and the second profile member into fixing flangings for fastening corresponding lateral sides, respectively, thereby yielding the nested profile combination; and discharging the nested profile combination from the production line.

In a class of this embodiment, to improve the working efficiency and to ensure the coherence of the processes and a continuous operation of the production line, the nesting process comprises the following steps:
 a) transporting the profile to a rotating positioning device in a direction of the production line; allowing the cutting device and the profile to move synchronously when the profile touches a first detecting contact, and cutting the profile by the cutting device to yield the first profile member;
 b) allowing the rotating positioning device to move on a nesting base of the nesting device, leaving a required interval between the rotating positioning device and the profile being transported;
 c) rotating the first profile member for 180° by the rotating positioning device when the first profile member moves along with the rotating positioning device and touches the second detecting contact; and resetting the cutting device and the rotating positioning device;
 d) during the resetting of the rotating positioning device, transporting the profile to the rotating positioning device to perform the nesting between the first profile member and the profile;
 e) allowing the cutting device and the profile to move synchronously when the profile touches the first detecting contact again, and cutting the profile by the cutting device to yield the second profile member; continuing transporting the profile whereby pushing the second profile member and continuing nesting the second profile member and the first profile member; and
 f) completely nesting the first profile member and the second profile member to form the profile combination; continuing transporting the profile whereby pushing the profile combination for a subsequent process; repeating step a) for another nesting process when the profile touches the first detecting contact.

In accordance with another embodiment of the invention, there provided is a system for manufacturing a nested profile combination in accordance with the above method. The system comprises: the profile planisher; the first rolling die set, the first rolling die set comprising a plurality of first rolling sets; a punching device, the punching device comprising a punching bed and a punching machine; the second rolling die set, the second rolling die set comprising a plurality of second rolling sets; the cutting device, the cutting device comprising a cutter; the nesting device; and the third rolling die set, the third rolling die set comprising a third rolling set. The profile planisher, the first rolling die set, the punching bed, the second rolling die set, and the third rolling die set are fixed on the ground. The first rolling sets are provided for the formation of the stiffener. The punching machine is horizontally movable on the punching bed. The second rolling sets operate to form the required cross section of the profile. The cutter operates to cut the profile to yield the first profile member and the second profile member. The nesting device operates to rotate the first profile member for 180°, position the first profile member, and nest the first profile member and the second profile member together to form the profile combination. The third rolling set operates to shape the encircling flangings into the fixing flangings.

In a class of this embodiment, to improve the quality of the nesting process and to prevent the nested profile combination from deformation, the nesting device comprises: a nesting bed; a nesting base; and a rotating positioning device, the rotating positioning device comprising a saddle, a first gas cylinder, two steady rests, and two rotators. The nesting bed is fixed on the ground. The nesting base is disposed and is horizontally movable on the nesting bed. The saddle is disposed and is horizontally movable on the nesting base. The saddle is connected to the first gas cylinder, and the first gas cylinder drives the rotating positioning device to move on the nesting base. The two steady rests are oppositely fixed on the saddle at a certain interval. The rotator is arranged inside each steady rest and is rotatable in relation to the steady rest. The rotator comprises a square hole and a plurality of clamps. The square hole passes through the rotator in a direction of a length of the rotator and matches with the profile. Each clamp comprises: a guide rail, and a chuck. The guide rail is fixed on the end face of the rotator, and the chuck is movable on the guide rail and leans against the first profile member. The clamps are arranged on an end face of the rotator surrounding the square hole. Thus, the clamps tightly lean against the profile for ensuring the nesting of the first profile member and the second profile member.

In a class of this embodiment, to ensure the first profile member to rotate within 180° and to prevent inaccurate rotation that affects the nesting process, a plurality of tooth spaces are arranged on a circumferential face of the rotator at a certain interval between each other. Two first positioning pins are inserted into two opposite tooth spaces at an angle of circumference of 180° for limiting a rotating direction of the rotator. When the rotator rotates for 180°, the first positioning pins are inserted into the corresponding tooth spaces to limit the position of the rotator on the steady rest, and to prevent the rotator from deviating from the steady rest, so that the accuracy and reliability of the nesting process is ensured.

In a class of this embodiment, to achieve the linkage between the cutting device and the nesting device and to ensure the coherence between the cutting process and the nesting process, the cutting device comprises: a cutting base, and the cutter. The cutting base is disposed and is horizontally movable on the nesting bed. The cutting base is in rigid connection with the nesting base. The cutting base is connected to a second gas cylinder for driving the cutting base to move on the nesting bed. The cutter is disposed on the cutting base. The nesting base is provided with a cutting stopper and a positioning stopper in a direction of a length of the nesting base. The cutting stopper operates to control the cutting; and the positioning stopper operates to control the rotation of the rotating positioning device. A resetting stopper is arranged on one side of the nesting bed close to the cutting base for limiting a movement of the cutting base. Because the cutting base and the nesting base are in rigid connection, once the cutting device is reset, the nesting base is synchronously reset. Besides, the second profile member and the first profile member are ensured to have the same positioning reference and the same cutting length.

In a class of this embodiment, to prevent the stopper from interfering with the metal strip whereby successively transporting the metal strip and the profile on the production line, the cutting stopper and the positioning stopper are upwardly and downwardly stretchable stoppers. The cutting stopper and the positioning stopper operate to detect positions of the metal strip or the cut profile member on the production line, as well as control the motion of the cutter and the rotator. The stretch of the cutting stopper and the positioning stopper is controlled by corresponding gas cylinders. To detect the positions of the metal strip or the cut profile member, piston rods of the gas cylinders push the stoppers upwards; after the detection of the positions, the piston rods of the gas cylinders retracts to allow the stoppers move downwardly.

In a class of this embodiment, to improve the accuracy of the punching process, the punching device comprises: the punching bed fixed on the ground, and the punching machine being horizontally movable on the punching bed. The punching bed is also provided with a fifth gas cylinder for driving the punching machine to move on the punching bed. During the punching process, the punching machine moves along with the metal strip and is reset by the fifth gas cylinder after the punching process.

In a class of this embodiment, to exert a certain pressure on a front end of the metal strip to avoid deformation in the punching process, the punching device comprises a pressing device. The pressing device comprises: a pressing plate, an oil cylinder, and a pressing base. The oil cylinder drives the pressing plate to move upwardly and downwardly. The pressing base is horizontally movable on the punching bed, and is in rigid connection with the punching machine. A piston rod of the fifth gas cylinder is in rigid connection with the pressing base.

In a class of this embodiment, to further improve the accuracy of the positions of the through holes, a second positioning pin is arranged on a bottom of the pressing plate. The second positioning pin is capable of passing through shaped through holes of the metal strip. When the punching process is completed, the second positioning pin is inserted into the through hole for positioning, thereby ensuring the accuracy of the positions of the subsequent through holes.

Advantages of the invention are summarized as follows: First of all, the forming process of a stiffener is designed before the punching process, so that the accuracy of the distance between the through holes is ensured, thereby improving the product quality. Second, the metal strip is automatically transported along the production line, and all the procedures are arranged on the successive production line, so that the automatic production of the nested profile combination is realized, a large amount of the mechanical working time and auxiliary working time are saved, and the production efficiency is highly improved. Third, the metal strip is successively transported for performing different procedures on the production line, and the procedures are arranged on the production line and are successively connected. Thus, the energy consumption of the raw material can be largely lowered, and the availability of the material is highly improved, thereby lowering the production cost. Finally, automation of all the procedures largely lowers the labor intensity, and improves the working environment and the availability of the working area.

BRIEF DESCRIPTION OF THE DRAWINGS

The invention is described herein below with reference to the accompanying drawings, in which.

DETAILED DESCRIPTION OF THE EMBODIMENTS

For further illustrating the invention, experiments detailing a system and a method for manufacturing a nested profile combination are described below. It should be noted that the following examples are intended to describe and not to limit the invention.

Figure 1:
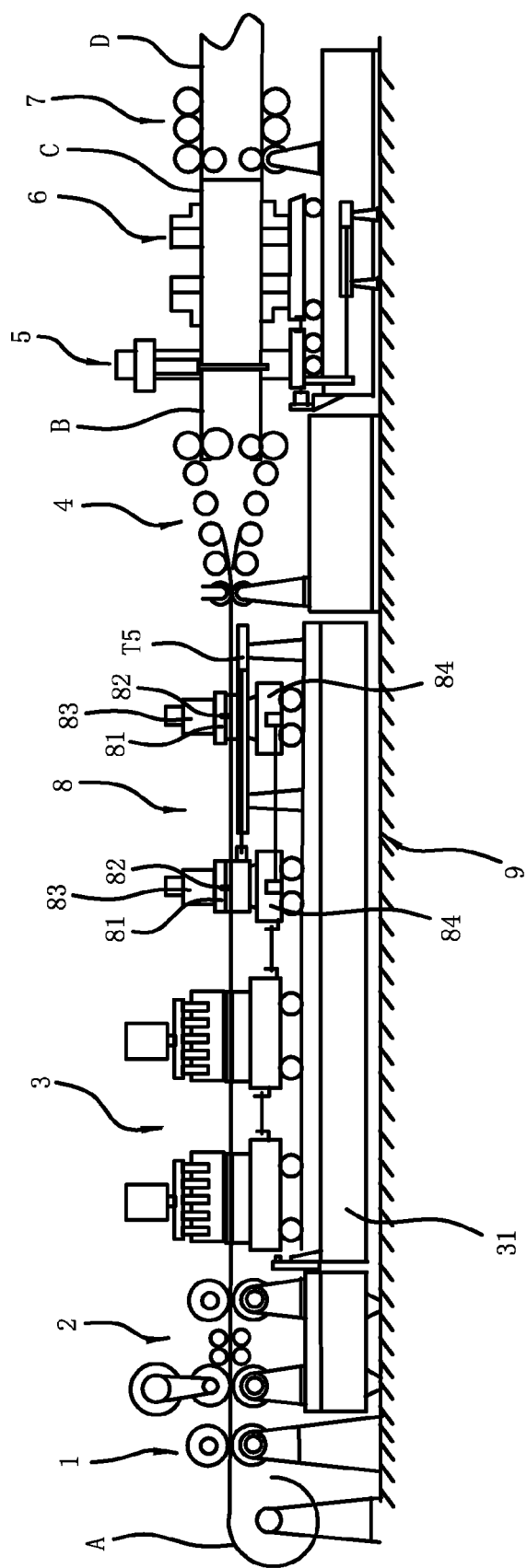
FIG. 1 is a structure diagram of a production line for manufacturing a nested profile combination in accordance with one embodiment of the invention.
Figure 2:
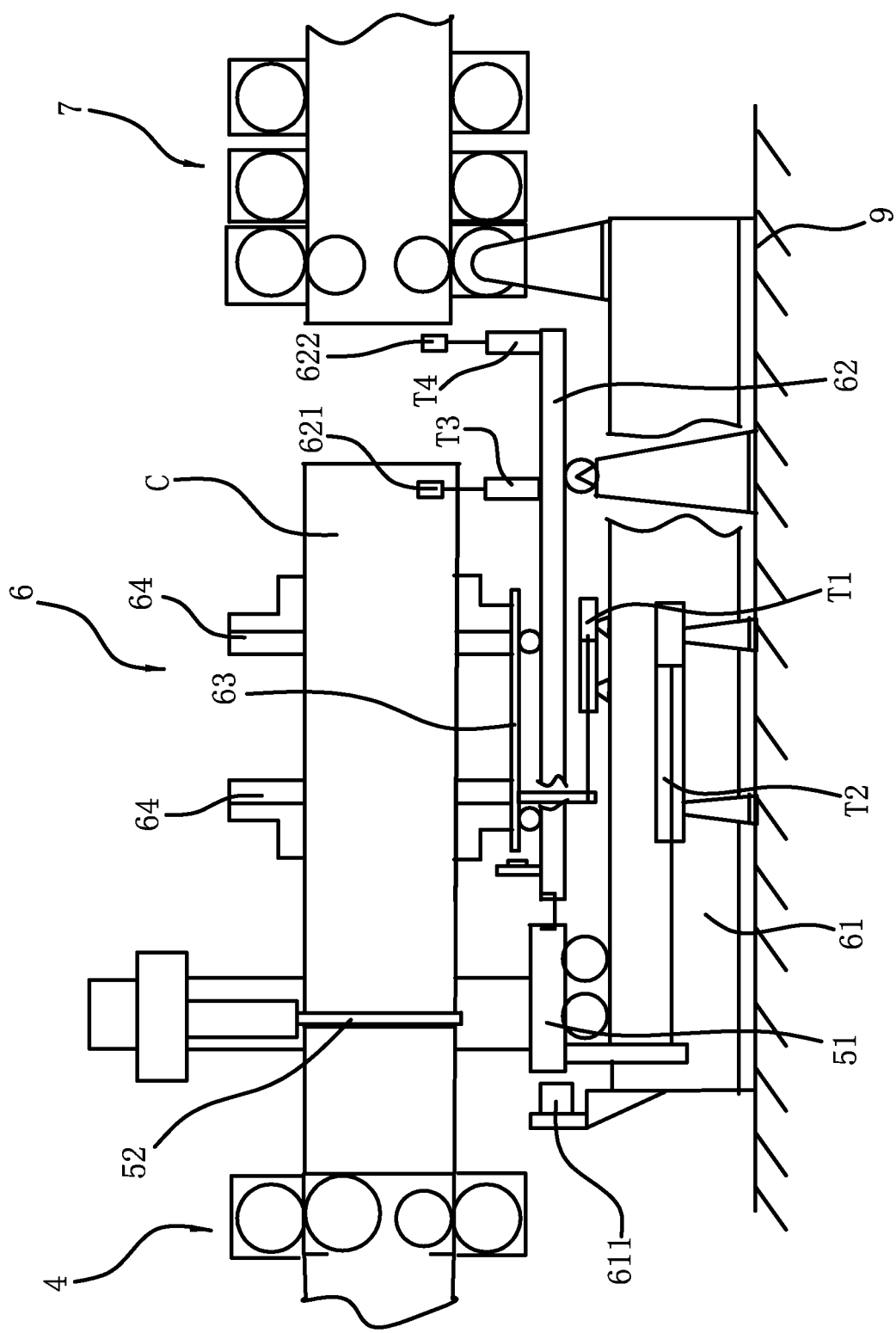
FIG. 2 is an enlarge view of a cutting device and a nesting device of FIG. 1 in accordance with one embodiment of the invention.
Figure 3:
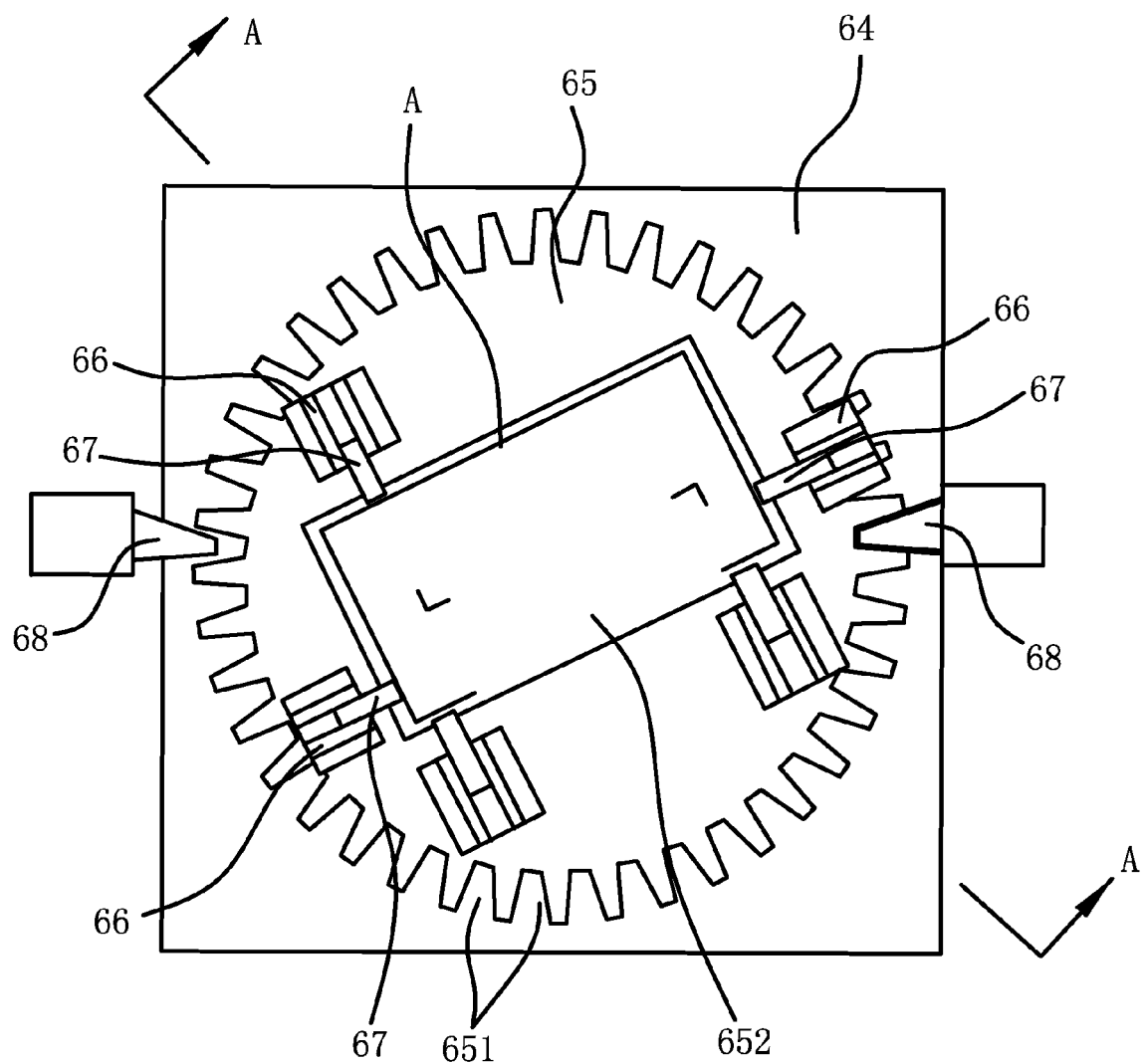
FIG. 3 is a structure diagram of a nesting device in an axial direction of a production line of FIG. 1 in accordance with one embodiment of the invention.
Figure 4:
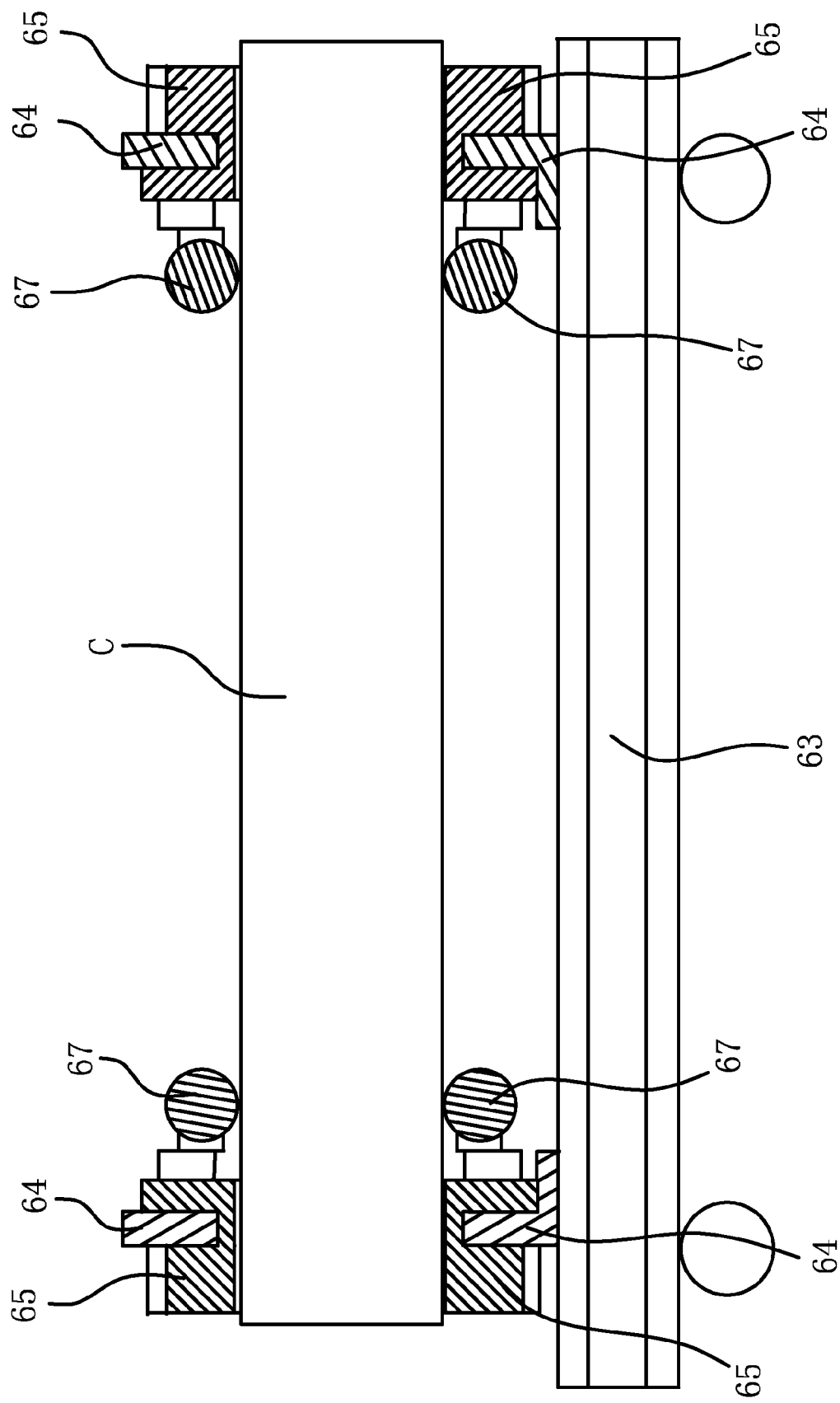
FIG. 4 is a structure diagram of a nesting device of FIG. 3 taken from line A-A in accordance with one embodiment of the invention.
Figure 5:
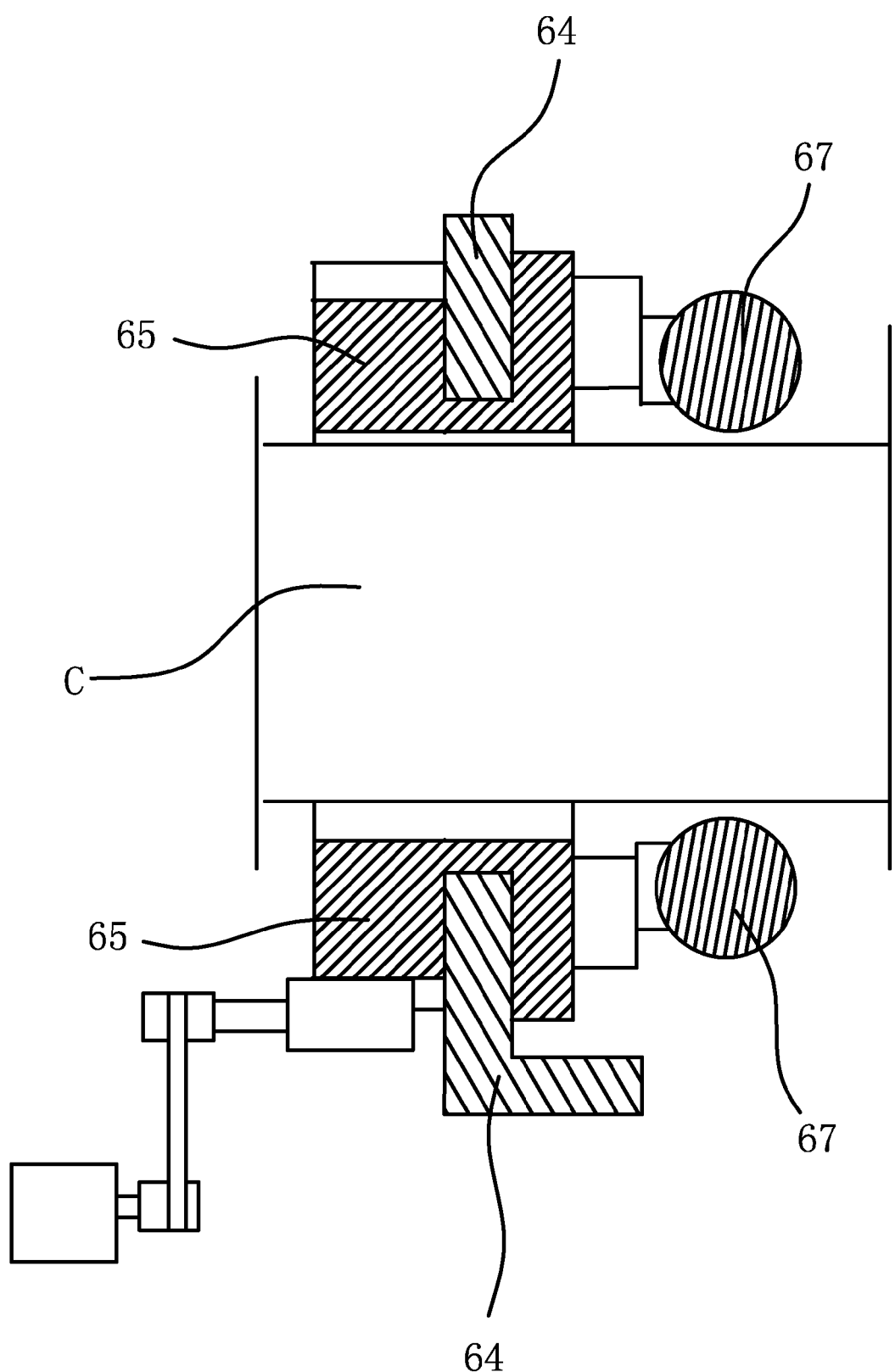
FIG. 5 is a structure diagram of a transmission structure of a nesting device of FIG. 4 in accordance with one embodiment of the invention.
Figure 6:
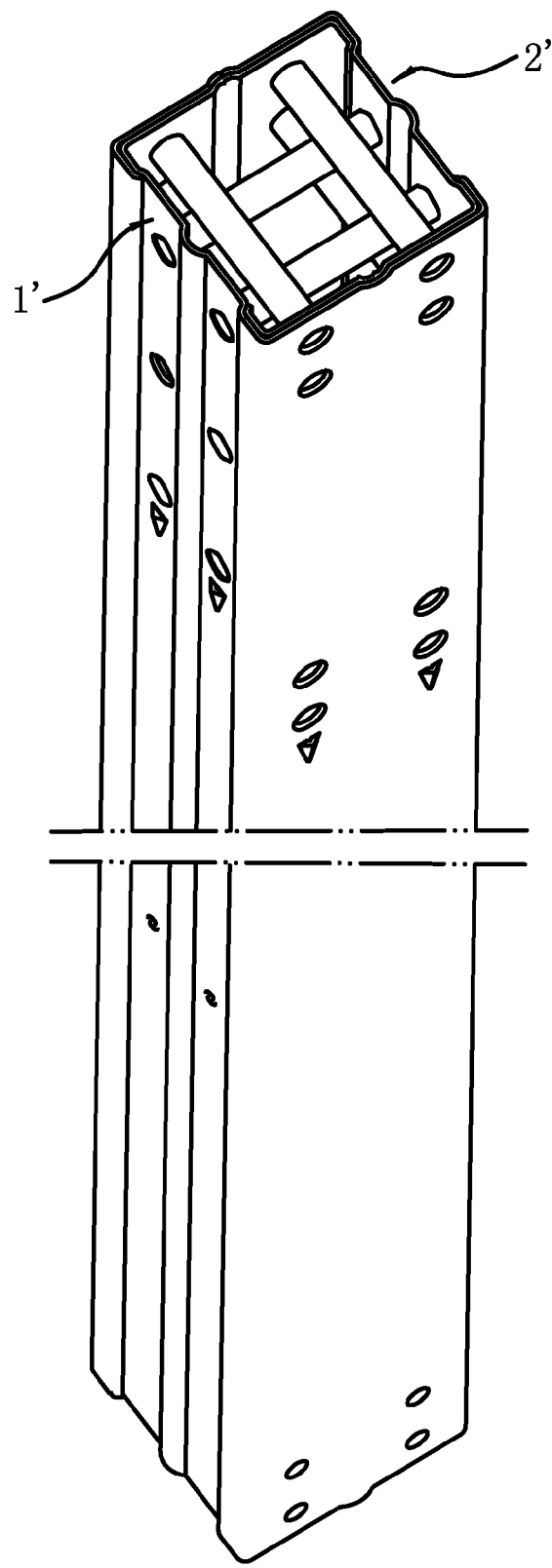
FIG. 6 is a stereogram of a nested profile combination in prior arts.
Figure 7:
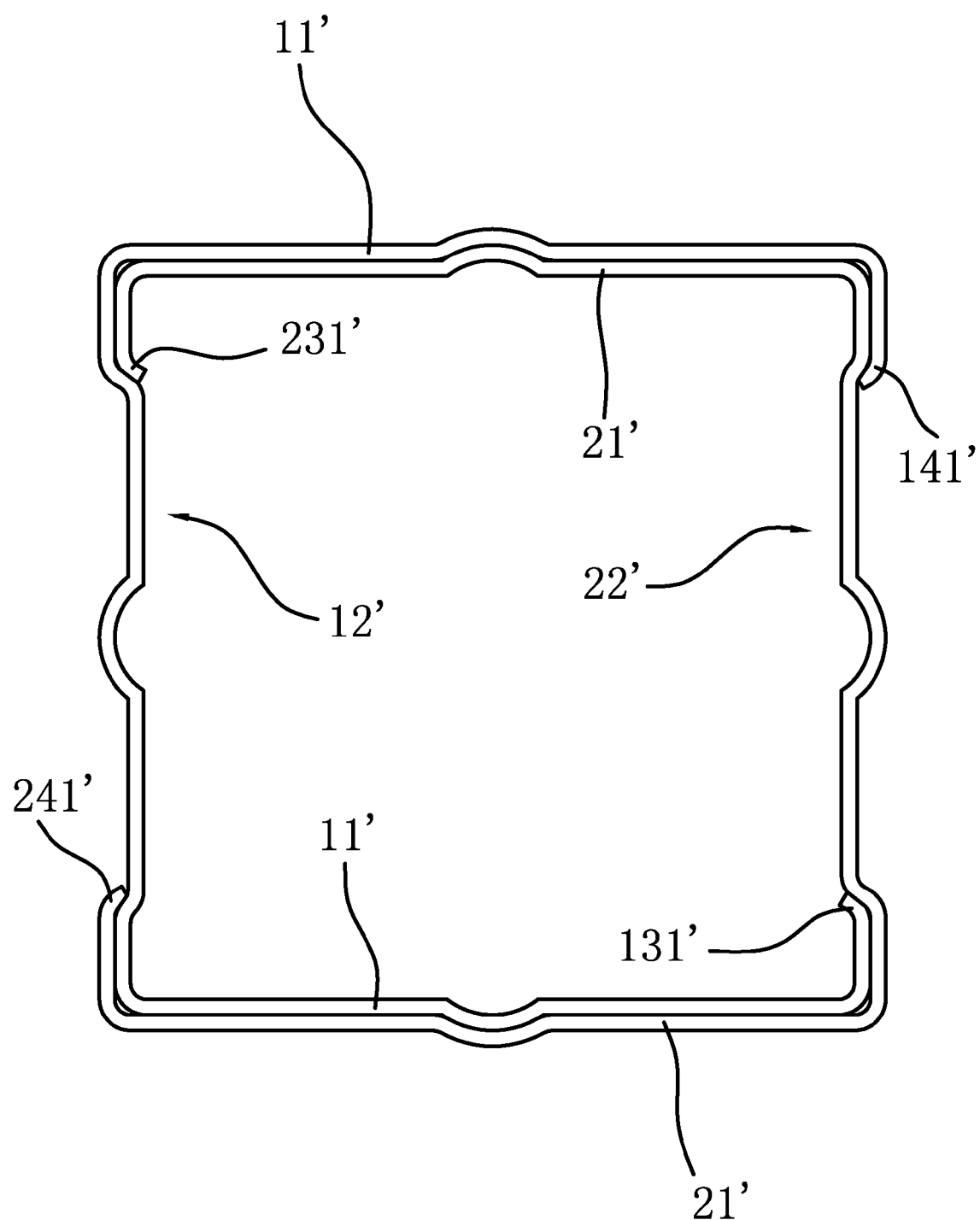
FIG. 7 is a cross sectional view of a nested profile combination (after assembly)
Figure 8:
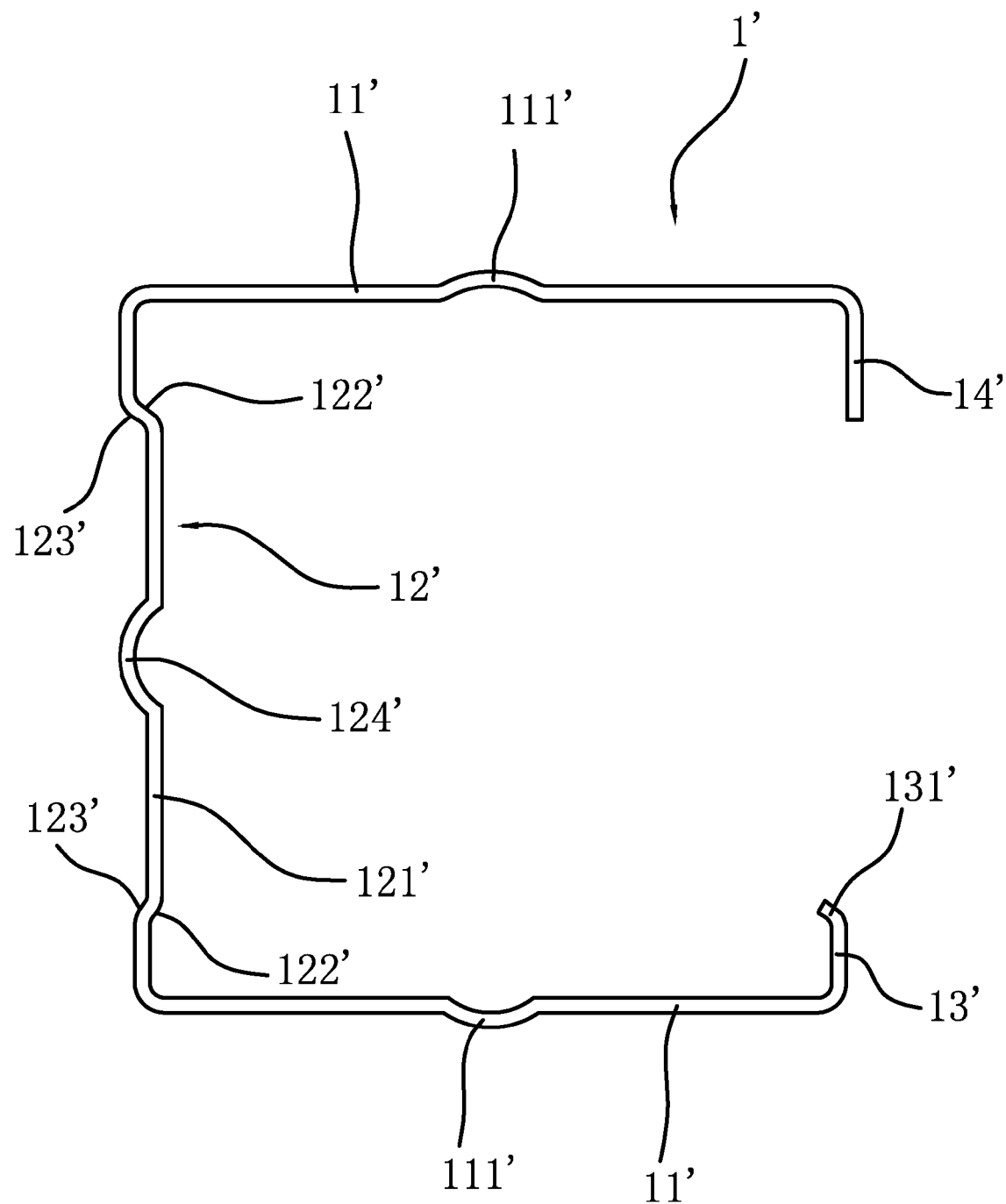
FIG. 8 is a structure diagram of a first profile member of FIG. 7 (before assembly)
Figure 9:
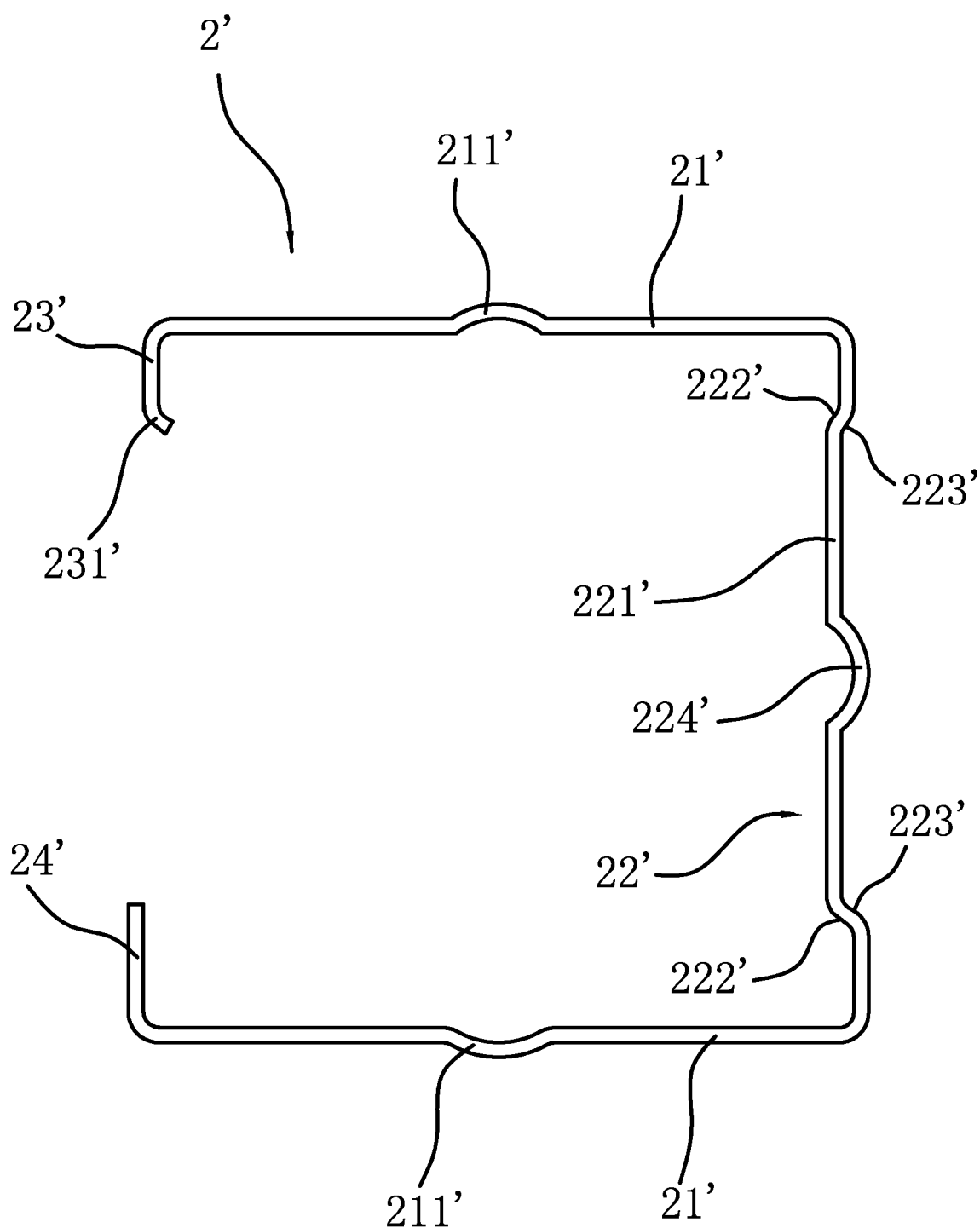
FIG. 9 is a structure diagram of a second profile member of FIG. 7 (before assembly).

As shown in FIGS. 1-5, a system for manufacturing a nested profile combination is an automatic production line comprising a plurality of procedures. A metal strip A transported into a feeder is employed as a raw material. The metal strip A is automatically transported to subsequent procedures along the production line.

The system comprises the following devices in an order of arrangement thereof on the production line:

A profile planisher 1, the profile planisher 1 operates to planish the metal strip A transported to the production line.

A first rolling die set 2, the first rolling die set 2 is fixed on the ground 9 and comprises a plurality of first rolling sets for forming a required stiffener.

A punching device 3, the punching device 3 comprises: a punching bed 31 fixed on the ground 9; a punching machine being horizontally movable on the punching bed 31; a fifth gas cylinder T5 fixed on the punching bed 31 and driving the punching machine to move on the punching bed 31; and a pressing device 8. The pressing device 8 comprises: a pressing plate 81, an oil cylinder 83, and a pressing base 84. The oil cylinder 83 drives the pressing plate 81 to move upwardly and downwardly. The pressing base 84 drives the pressing plate 81 to move horizontally on the punching bed 31 and is in rigid connection with the punching machine. A piston rod of the fifth gas cylinder T5 is in rigid connection with the pressing base 84. A second positioning pin 82 is arranged on a bottom of the pressing plate 81. The second positioning pin 82 is capable of passing through shaped through holes of the metal strip A during the punching process. During the punching process, the punching machine moves along with the metal strip. When the punching process is completed, the second positioning pin 82 is inserted into the through hole for positioning, and the punching machine is reset by the fifth gas cylinder T5 after the punching process.

A second rolling die set 4, the second rolling die set 4 is fixed on the ground 9 and comprises a plurality of second rolling sets to form a required cross section of the profile B. The required cross section of the profile B comprises: a transverse side, a lateral side, an embedded flanging, an encircling flanging, and a bent part.

A cutting device 5, the cutting device operates to cut the profile B to yield a first profile member and a second profile member. The cutting device 5 comprises: a cutting base 51, and a cutter 52. The cutting base 51 is disposed and is horizontally movable on the nesting bed 61. The cutting base 51 is in rigid connection with the nesting base 62. The cutting base 51 is connected to a second gas cylinder T2 for driving the cutting base 51 to move on the nesting bed 61. The cutter 52 is disposed on the cutting base 51. The nesting base 62 is provided with a cutting stopper 621 and a positioning stopper 622 in a direction of a length of the nesting base 62. The cutting stopper 621 is used as a first detecting contact to detect a position of the profile B and control the motion of the cutter 52. The positioning stopper 622 is used as a second detecting contact to detect a position of the first profile member and to control the rotation of the rotating positioning device. A resetting stopper 611 is arranged on one side of the nesting bed 61 close to the cutting base 51 for limiting a movement of the cutting base 51. Because the cutting base and the nesting base are in rigid connection, once the cutting device is reset, the nesting base is ensured to synchronously reset. Besides, the second profile member and the first profile member are ensured to have the same position reference and the same cutting length.

The cutting stopper 621 and the positioning stopper 622 are upwardly and downwardly stretchable stoppers. The cutting stopper 621 is connected to a piston rod of a third gas cylinder T3, and the positioning stopper 622 is connected to a piston rod of a fourth cylinder T4. The cutting stopper 621 and the positioning stopper 622 operate to detect positions of the metal strip or the cut profile member on the production line, as well as control the motion of the cutter and the rotator. To detect the positions of the metal strip or the cut profile member, piston rods of the gas cylinders push the stoppers upwards; after the detection of the positions, the piston rods of the gas cylinders retracts to allow the stoppers move downwardly.

A nesting device 6, the nesting device 6 operates to rotate the first profile member for 180°, to position the first profile member, and to nest the first profile member and the second profile member together to form the profile combination C. The nesting device 6 comprises: a nesting bed 61; a nesting base 62; and a rotating positioning device, the rotating positioning device comprising a saddle 63, a first gas cylinder T1, two steady rests 64, and two rotators 65. The nesting bed 61 is fixed on the ground 9. The nesting base 62 is disposed and is horizontally movable on the nesting bed 61. The saddle 63 is disposed and is horizontally movable on the nesting base 62. The saddle 63 is connected to the first gas cylinder T1, and the first gas cylinder T1 drives the rotating positioning device to move on the nesting base 62. The two steady rests 64 are oppositely fixed on the saddle 63 at a certain interval. The rotator 65 is arranged inside each steady rest 64 and is rotatable in relation to the steady rest 64. A plurality of tooth spaces 651 are arranged on a circumferential face of the rotator 65 at a certain interval between each other. Two first positioning pins 68 are inserted into two opposite tooth spaces 651 at an angle of circumference of 180° for limiting a rotating direction of the rotator 65. When the rotator 65 rotates for 180°, the first positioning pins 68 are inserted into the corresponding tooth spaces to limit the position of the rotator on the steady rest, and to prevent the rotator from deviating from the steady rest, so that the accuracy and reliability of the nesting process is ensured. The rotator 65 comprises a square hole 652 and a plurality of clamps. The square hole 652 passes through the rotator 65 in a direction of a length of the rotator 65 and matches with the profile B. Each clamp comprises: a guide rail 66, and a chuck 67. The guide rail 66 is fixed on the end face of the rotator 65, and the chuck 67 is movable on the guide rail 66 and leans against the first profile member. The clamps are arranged on an end face of the rotator surrounding the square hole 652. The rotator 65 is capable of clamping profiles of different sizes and shapes by adjusting the position of the chuck in relation to the guide rail 66.

A third rolling die set 7. The third rolling die set 7 comprises a third rolling set. The third rolling set operates to shape the encircling flangings into fixing flangings.

A method for manufacturing a nested profile combination. The method is automatically completed on the production line, and comprises the following steps:

1) planishing process: transporting the metal strip A to the profile planisher 1 for planishing, and transporting the metal strip A automatically to a subsequent process of the production line;

2) forming process of a stiffener: transporting the metal strip A to the first rolling die set 2, rolling the metal strip A to form the stiffener;

3) punching process: transporting the metal strip A comprising the stiffener to the punching device 3 to form through holes on the metal strip A;

4) cross section shaping process: transporting the punched metal strip A to the second rolling die set 4, rolling the metal strip A to yield the profile B having a cross section in a required shape, the profile B comprising the transverse side, the lateral side, the embedded flanging, the encircling flanging, and the bent part;

5) nesting process: cutting the profile B to yield the first profile member and the second profile member, nesting the first profile member and the second profile member to form the profile combination C; the nesting process comprises the following steps:

- a) transporting the profile B to the rotating positioning device in a direction of the production line; allowing the cutting device 5 and the profile B to move synchronously when the profile B touches the first detecting contact, and cutting the profile B by the cutting device 5 to yield the first profile member;
- b) allowing the rotating positioning device to move on the nesting base 62 of the nesting device 6, leaving a required interval between the rotating positioning device and the profile B being transported;
- c) rotating the first profile member for 180° by the rotating positioning device when the first profile member moves along with the rotating positioning device and touches the second detecting contact; and resetting the cutting device 5 and the rotating positioning device;
- d) during the resetting of the rotating positioning device, transporting the profile B to the rotating positioning device to perform the nesting between the first profile member and the profile B;
- e) allowing the cutting device 5 and the profile B to move synchronously when the profile B touches the first detecting contact again, and cutting the profile B by the cutting device 5 to yield the second profile member; continuing transporting the profile B whereby pushing the second profile member and continuing nesting the second profile member and the first profile member; and
- f) completely nesting the first profile member and the second profile member to form the profile combination C; continuing transporting the profile B whereby pushing the profile combination C for a subsequent process; repeating step a) for another nesting process when the profile B touches the first detecting contact;
  after the nesting process, the encircling flanging of the first profile member contacting with the lateral side of the second profile member and the encircling flanging of the second profile member contacting with the lateral side of the first profile member; and
- 6) fastening process: transporting the profile combination C to the third rolling die set 7, shaping the encircling flangings of the first profile member and the second profile member into fixing flangings for fastening corresponding lateral sides, respectively, thereby yielding the nested profile combination D; and discharging the nested profile combination D from the production line.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for manufacturing a nested profile combination, the system comprising:
   a) a profile planisher;
   b) a first rolling die set, the first rolling die set comprising a plurality of first rolling sets;
   c) a punching device, the punching device comprising a punching bed and a punching machine;
   d) a second rolling die set, the second rolling die set comprising a plurality of second rolling sets;
   e) a cutting device, the cutting device comprising a cutter;
   f) a nesting device; and
   g) a third rolling die set, the third rolling die set comprising a third rolling set;

wherein:
the profile planisher, the first rolling die set, the punching bed, the second rolling die set, and the third rolling die set are adapted to be fixed on the ground;
the first rolling sets are provided for the formation of a stiffener;
the punching machine is horizontally movable on the punching bed;
the second rolling sets operate to form required cross section of a profile;
the cutter operates to cut the profile to yield a first profile member and a second profile member;
the nesting device operates to rotate the first profile member for 180°, position the first profile member, and nest the first profile member and the second profile member together to form the profile combination;
the third rolling set operates to shape encircling flangings into fixing flangings;
the nesting device comprises a nesting bed, a nesting base, and a rotating positioning device;
the rotating positioning device comprises a saddle, a first gas cylinder, two steady rests, and two rotators;
the nesting bed is adapted to be fixed on the ground;
the nesting base is disposed and is horizontally movable on the nesting bed;
the saddle is disposed and is horizontally movable on the nesting base; the saddle is connected to the first gas cylinder, and the first gas cylinder drives the rotating positioning device to move on the nesting base;
the two steady rests are oppositely fixed on the saddle at a certain interval; the two rotators are arranged inside each steady rest and are rotatable in relation to the steady rest;
each rotator comprises a square hole and a plurality of clamps; the square hole passes through the each rotator in a direction of a length of the each rotator and matches with the profile; the plurality of clamps is arranged on an end face of the each rotator surrounding the square hole; and
each clamp comprises a guide rail and a chuck; the guide rail is fixed on the end face of the each rotator, and the chuck is movable on the guide rail and leans against the first profile member.

2. The system of claim 1, wherein
the punching device comprises: the punching bed fixed on the ground, and the punching machine being horizontally movable on the punching bed; and
the punching bed is provided with a fifth gas cylinder for driving the punching machine to move on the punching bed.

3. The system of claim 2, wherein
the punching device comprises a pressing device;
the pressing device comprises: a pressing plate, an oil cylinder, and a pressing base;
the oil cylinder drives the pressing plate to move upwardly and downwardly;
the pressing base is horizontally movable on the punching bed, and is in rigid connection with the punching machine; and
a piston rod of the fifth gas cylinder is in rigid connection with the pressing base.

4. The system of claim 3, wherein a second positioning pin is arranged on a bottom of the pressing plate; and the second positioning pin is capable of passing through shaped through holes of the metal strip.

5. A system for manufacturing a nested profile combination in accordance with a method, the method comprising the following steps carried out on a production line:
1) transporting a metal strip to a profile planisher for planishing, and transporting the metal strip automatically to a subsequent process;
2) transporting the metal strip to a first rolling die set, rolling the metal strip to form a stiffener;
3) transporting the metal strip comprising the stiffener to a punching device, and punching the metal strip to form through holes;
4) transporting the punched metal strip to a second rolling die set, rolling the metal strip to yield a profile having a cross section in a required shape, the profile comprising an embedded flanging and an encircling flanging;
5) transporting the profile to a cutting device, cutting the profile to yield a first profile member; transporting the first profile member to a nesting device, rotating the first profile member for 180° in a direction of the cross section thereof, and positioning the first profile member; cutting the profile again to yield a second profile member; and inserting and nesting the first profile member in the second profile member to form a profile combination, whereby the encircling flanging of the first profile member contacting with a lateral side of the second profile member and the encircling flanging of the second profile member contacting with a lateral side of the first profile member; and
6) transporting the profile combination to a third rolling die set, shaping the encircling flangings of the first profile member and the second profile member into fixing flangings for fastening corresponding lateral sides, respectively, whereby yielding the nested profile combination;

the system comprising:
a) the profile planisher;
b) the first rolling die set, the first rolling die set comprising a plurality of first rolling sets;
c) a punching device, the punching device comprising a punching bed and a punching machine;
d) the second rolling die set, the second rolling die set comprising a plurality of second rolling sets;
e) the cutting device, the cutting device comprising a cutter;
f) the nesting device; and
g) the third rolling die set, the third rolling die set comprising a third rolling set;

wherein:
the profile planisher, the first rolling die set, the punching bed, the second rolling die set, and the third rolling die set are adapted to be fixed on the ground;
the first rolling sets are provided for the formation of the stiffener;
the punching machine is horizontally movable on the punching bed;
the second rolling sets operate to form the cross section of the profile;
the cutter operates to cut the profile to yield the first profile member and the second profile member;
the nesting device operates to rotate the first profile member for 180°, position the first profile member, and nest the first profile member and the second profile member together to form the profile combination;
the third rolling set operates to shape the encircling flangings into the fixing flangings;
the nesting device comprises: a nesting bed; a nesting base; and a rotating positioning device, the rotating positioning device comprising a saddle, a first gas cylinder, two steady rests, and two rotators;
the nesting bed is adapted to be fixed on the ground;
the nesting base is disposed and is horizontally movable on the nesting bed;
the saddle is disposed and is horizontally movable on the nesting base; the saddle is connected to the first gas cylinder, and the first gas cylinder drives the rotating positioning device to move on the nesting base;
the two steady rests are oppositely fixed on the saddle at a certain interval; the two rotators are arranged inside each steady rest and is rotatable in relation to the steady rest;
each rotator comprises: a square hole (652), and a plurality of clamps; the square hole (652) passes through the each rotator in a direction of a length of the each rotator and matches with the profile; the plurality of clamps is arranged on an end face of the each rotator surrounding the square hole (652); and
each clamp comprises: a guide rail, and a chuck; the guide rail is fixed on the end face of the each rotator, and the chuck is movable on the guide rail and leans against the first profile member.

6. The system of claim 5, wherein a plurality of tooth spaces are arranged on a circumferential face of the two rotators at a certain interval between each other; two first positioning pins are inserted into two opposite tooth spaces at an angle of circumference of 180° for limiting a rotating direction of the two rotators.

7. The system of claim 5, wherein
the cutting device comprises: a cutting base, and the cutter;
the cutting base is disposed and is horizontally movable on the nesting bed; the cutting base is in rigid connection with the nesting base; the cutting base is connected to a second gas cylinder for driving the cutting base to move on the nesting bed;
the cutter is disposed on the cutting base;
the nesting base is provided with a cutting stopper and a positioning stopper in a direction of a length of the nesting base; the cutting stopper operates to control the cutting; and the positioning stopper operates to control the rotation of the rotating positioning device; and
a resetting stopper is arranged on one side of the nesting bed close to the cutting base for limiting a movement of the cutting base.

8. The system of claim 7, wherein the cutting stopper and the positioning stopper are upwardly and downwardly stretchable stoppers.

* * * * *